United States Patent [19]

Hirsbrunner et al.

[11] Patent Number: 5,443,633
[45] Date of Patent: Aug. 22, 1995

[54] SOIL TREATMENT WITH POLYMERIC HYDROGEN SILOXANE

[75] Inventors: Pierre Hirsbrunner, Les Monts-De-Corsier; Denys Roulin, Clarens, both of Switzerland

[73] Assignee: Nestec S.A., Vevey, Switzerland

[21] Appl. No.: 141,414

[22] Filed: Oct. 22, 1993

Related U.S. Application Data

[63] Continuation of Ser. No. 337,345, Apr. 13, 1989, abandoned.

[30] Foreign Application Priority Data

May 13, 1988 [EP] European Pat. Off. ........... 88107715

[51] Int. Cl.$^6$ .............................................. C09K 17/00
[52] U.S. Cl. ...................... 106/287.13; 106/287.11; 106/287.14; 106/287.16; 404/91; 405/264; 556/451
[58] Field of Search ............... 106/2, 287.11, 287.13, 106/900, 287.14, 287.16; 404/91; 405/264; 556/451

[56] References Cited

U.S. PATENT DOCUMENTS

| | | |
|---|---|---|
| 2,281,810 | 5/1942 | Stone et al. . |
| 2,832,754 | 4/1958 | Jex et al. . |
| 2,930,809 | 3/1960 | Jex et al. . |
| 3,070,161 | 12/1962 | Kerver et al. . |
| 3,325,439 | 6/1967 | Steinbach et al. ............... 556/451 |
| 3,450,736 | 6/1969 | De Monterey ................... 556/451 |
| 3,481,768 | 12/1969 | Gowdy ................................ 106/2 |
| 3,998,643 | 12/1976 | Liddle ................................ 106/2 |
| 4,027,428 | 6/1977 | Hillel ................................ 47/58 |

FOREIGN PATENT DOCUMENTS

| | | |
|---|---|---|
| 1541089 | 8/1968 | France . |
| 2530651 | 4/1984 | France . |
| 1228569 | 2/1966 | Germany . |

*Primary Examiner*—David Brunsman
*Attorney, Agent, or Firm*—Vogt & O'Donnell

[57] ABSTRACT

The invention relates to the use of a composition which, in a liquid carrier, contains a polymeric hydrogen siloxane (or (H) siloxane) corresponding to the following general formula

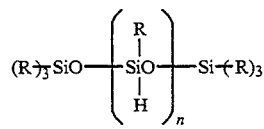

in which n is a number of from 1 to 70 and R is an alkyl, hydroxyalkyl, aminoalkyl, haloalkyl or aryl radical.

The liquid carrier is, for example, water or dichloromethane.

11 Claims, No Drawings

SOIL TREATMENT WITH POLYMERIC HYDROGEN SILOXANE

CROSS-REFERENCE TO RELATED APPLICATION

This is a continuing application of application Ser. No. 07/337,345 filed Apr. 13, 1989, now abandoned.

BACKGROUND OF THE INVENTION

This invention relates to the use of a soil treatment composition by which it is possible to make the surface water-repellent and, hence, to obtain good water retention in the underlying layers.

The present invention addresses the problem of providing a composition which enables water retention to be improved, particularly under desert-like conditions. This objective is important because it is known that, under desert-like conditions, a certain proportion of the water is precipitated at the break of day and evaporates in the first few hours thereafter. The desired objective is to find a composition to enable this water to be retained in the soil. FR-PS 1 541 089 relates to a soil treatment process wherein an emulsion of asphalt and water applied in a quantity of up to 2 t/ha produces a retention of 30%. The disadvantage of this process is, on the one hand, the high application rate and, on the other hand, the inadequate retention.

SUMMARY OF THE INVENTION

The present invention relates to the use of a composition which, in a liquid carrier, contains a polymeric hydrogen siloxane (or (H) siloxane) corresponding to the following general formula

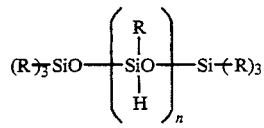

in which
n is a number of from 1 to 70 and
R is an alkyl, hydroxyalkyl, aminoalkyl, haloalkyl or aryl radical.

DETAILED DESCRIPTION OF THE INVENTION

In the present invention the liquid carrier is either water or an organic solvent. The hydrogen siloxane polymer is insoluble in water and forms an aqueous emulsion. The organic solvent is selected from the group consisting of alkanes, halogenated hydrocarbons, ketones and alkyl acetates, for example dichloromethane, methyl-ethyl ketones, ethyl, butyl or pentyl acetates, white spirit.

It is preferred to use water.

Two parameters have to be taken into account in evaluating the effect of the composition, namely water repellency and retention.

Water repellency is defined as the time taken by the water to pass through a soil which has been treated with one of the polymeric (H) siloxanes mentioned above. The time which the water takes to penetrate through the treated layer is a measure of water repellency and is normally between 5 and 30 minutes, which provides for a good accumulation of water.

Water retention is the percentage of water which remains beneath the layer of treated soil.

These two parameters are defined more closely hereinafter.

In the composition used, when the substituent R is an alkyl or a halo-alkyl, it may be a $C_1$–$C_{18}$ and preferably $C_1$–$C_{12}$ alkyl radical, more especially a methyl or fluoromethyl.

The number n is preferably from 5 to 45.

Thus, the present invention includes the use of a combination of a liquid carrier of water or dichloromethane and of polymeric (H) siloxane of the formula set forth above, wherein R is particularly a $C_1$–$C_{18}$ alkyl or a haloalkyl, particularly methyl or fluoromethyl, and wherein "n" preferably is a number from 5 to 45.

The content of polymeric (H) siloxane in the soil layer is between 125 and 200 ppm ($g/m^3$). The local surface treatment is preferably carried out with an (H) siloxane emulsion containing between 0.05 and 0.4% by weight of polymeric (H) siloxane. Aqueous solutions of polymeric (H) siloxanes are commercially available at the present time. They are applied in situ to the soil by conventional means of the type used for insecticides and fertilizers. The particular type of soil, above all sandy soils, is treated at 1–2 times per year. The mixture is distributed in such a way that a concentration of the polymeric (H) siloxane of from 10 to 40 kg/ha and preferably from 15 to 35 kg/ha is obtained on the soil, corresponding to 1–4 $g/m^2$ and 1.5–3.5 $g/m^2$, respectively.

Water repellency test

10 Parts dry sand and 1 part (H) siloxane composition are mixed and the mixture is stirred for 4 hours at 50° C. in a rotary evaporator. The siloxane-treated sand is uniformly applied in a layer thickness of 10 mm to a layer of dry untreated sand.

8–10 mm Water are then poured on and the time which this water takes to pass through the siloxane-treated sand is measured. Table I shows the results obtained with four different compositions.

TABLE 1

| Treatment composition | Concentration of the active agent ($g/m^3$ sand) ppm | Chemical reaction on application (silylation) | Time taken by water to penetrate into lower untreated layer |
|---|---|---|---|
| Polymethyl (H) Siloxane, fluoro-Substituted (SIM) (1) | 100 | Yes | Nil |
| | 150 | Yes | 2–5 minutes |
| | 175 | Yes | 0.5–2 hours |
| | 200 | Yes | 6–24 hours |
| | 300 | Yes | $\geq 48$ hours |
| Polymethyl (H) Siloxane Product A (2) | 175 | Yes | $\leq 60$ mins |
| | 200 | Yes | 24 hours |
| Polymethyl (H) Siloxane (Emulsion) Product B (3) | 200 | Yes | 2–30 mins |
| Polymethyl (H) Siloxane (Oil) Product C | 2000 | No | $\leq 1$ min |

(1) Silylating agent for impregnating leather and suede. Applied in dichloromethane (n = 10 ± 5)
(2) Applied in dichloromethane (n = 40 ± 5)
(3) n = 40 ± 5

The first three compositions show the greatest water-repellent activity. The most effective concentration for the first three products is 175 ppm which corresponds approximately to 2.6 $g/m^2$.

Water retention test

The water penetrates through the thoroughly treated layer without wetting it and is taken up into the underlying untreated water-absorbing layer. The overlying layer acts as protection against daily evaporation and as transfer medium during the second phase of the daily cycle. Water retention is defined as the ratio between the water remaining and the water evaporated from the solid, water-saturated untreated phase.

It is determined by gravimetry and is expressed in %.

$$\% \text{ retention} = \frac{P_o - P_t}{P_o} \times 100$$

where
$P_o$=loss, comparison value untreated
$P_t$=loss from treated sand

If the treatment is ideal, the retention is 100%. If it is ineffective, the retention approaches zero. The following procedure is adopted:

A layer of dry untreated sand is used as the soil and a 10 mm thick layer of treated sand is applied thereto. The water required to saturate the sand (1 part water to 3 parts sand) is sprayed on the surface. The weight loss is determined in dependence upon the time after exposure to IR lamps which keep the surface temperature at 55°–60° C. To determine the retention value, it is essential to carry out the test under the same conditions with an untreated sample. Table II below shows the results obtained with the same products as in the water repellency test.

TABLE II

| Treatment Composition | Concentration of active agent ppm (or g/m³) | Cumulated water loss (g/cm²) | | | | | Retention % (0–6 h) |
|---|---|---|---|---|---|---|---|
| | | 1 h | 2 h | 3 h | 6 h | 12 h | |
| SIM | 100 | 0.13 | 0.19 | 0.27 | 0.6 | 0.95 | 33 |
| | 150 | 0.06 | 0.14 | 0.21 | 0.42 | 0.75 | 53 |
| | 175 | 0.05 | 0.10 | 0.15 | 0.38 | 0.60 | 58 |
| | 200 | 0.03 | 0.09 | 0.14 | 0.33 | 0.60 | 65 |
| Product A | 200 | 0.07 | 0.1 | 0.15 | 0.30 | 0.6 | 63 |
| Product B | 200 | 0.13 | 0.16 | 0.20 | 0.30 | 0.6 | 67 |
| | 150 | 0.15 | 0.18 | 0.20 | 0.35 | 0.65 | 61 |
| | 200 | 0.05 | 0.10 | 0.14 | 0.27 | 0.57 | 70 |
| Product C | 2000 | 0.18 | 0.35 | 0.45 | 0.80 | 1.00 | 11 |

A retention above 50% is regarded as satisfactory. This level is achieved with the reacting polymethyl (H) siloxanes, i.e. the first three products in the Table.

150/200 ppm or g/m³ is regarded as an optimal application density.

Example

The Example relates to the local (in situ) application by spraying of an emulsion of polymethyl (H) siloxane in various dilutions using a spray gun with a 1 mm diameter nozzle. 2.6 g/m² Polymethyl (H) siloxane is applied to the surface in various dilutions. The test is carried out in accordance with the following scheme: dispersion of the emulsion of the agent (airgun, 1 bar), drying/reaction (1 day), surface application of water (1 g/cm²), gravimetric development as a function of time.

The measurements were conducted under normal temperature and pressure conditions at 60% relative air humidity.

The results are shown in Table III:

TABLE III

Effect of the thickness of the water-repellent layer (application of 25 kg/ha polymethyl (H) siloxane)

| Example No. | Concentration (% dry matter) | Thickness of water-repellent layer (mm) | Cumulated water loss (g/cm³) | | | | Retention % 0 to T + 2 |
|---|---|---|---|---|---|---|---|
| | | | T + 1 | T + 2 | T + 3 | T + 6 | |
| 0 | — | 0 | 0.46 | 0.85 | 1 | 1 | 0 (ref.) |
| 1 | 0.05 | 5–10 | 0.36 | 0.60 | 0.85 | 1 | 30% |
| 2 | 0.05 | 7–15 | 0.25 | 0.52 | 0.75 | 1 | 39% |
| 3 | 0.1 | 10–15 | 0.15 | 0.27 | 0.38 | 0.62 | 68% |
| 4 | 0.1 | 10–20 | 0.15 | 0.27 | 0.37 | 0.62 | 58% |
| 5 | 0.15 | 15–20 | 0.10 | 0.20 | 0.28 | 0.45 | 76% |
| 6 | 0.15 | 10–30 | 0.14 | 0.25 | 0.35 | 0.55 | 70% |
| 7 | 0.20 | 10–20 | 0.17 | 0.30 | 0.45 | 0.76 | 65% |
| 8 | 0.40 | 2–10 | 0.22 | 0.42 | 0.62 | 0.99 | 51% |
| 9 | 0.40 | 10–15 | 0.22 | 0.32 | 0.55 | 0.85 | 56% |
| 10 | 0.80 | 1–5* | 0.24 | 0.49 | 0.74 | 1 | 42% |

T = day of application,
* = formation of water-impermeable zone

The concentration of the active agent in local application is an important factor and, in this Example, maximum retention is obtained with a concentration of 0.15% dry matter.

Examination of the results shows that, above 0.4%, the quantity of water is too small to allow adequate diffusion of the agent. Below 0.05% the quantity of water is too large, the diluted agent enters the lower layers where its concentration is too weak to have an adequate water-repellent effect.

Accordingly, the treatment according to the invention provides for the permanent presence of water in the soil, the quantity being sufficient for the development of a living culture under desert-like conditions.

It is sufficient to apply the polymeric (H) siloxane mentioned in the described manner one or two times a year because the polymer is slowly degraded under the effect of light.

The process according to the invention may also be combined with the process according to European patent 0 136 447. In this case, the composition according to the invention is mixed with an aqueous solution of a formaldehyde-based precondensate containing a condensation initiator. The second solution is applied to the soil in a quantity of 100 kg/ha to 500 kg/ha, based on dry matter. It is thus possible simultaneously to protect the soil against erosion and to obtain improved water retention.

We claim:

1. A process for treating soil comprising applying on soil in situ a composition comprising a liquid carrier and a polymeric hydrogen siloxane compound of the formula

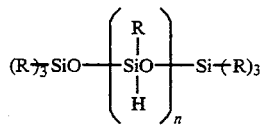

wherein n is a number of from 1 to 70, wherein R is selected from the group consisting of alkyl, hydroxyalkyl, aminoalkyl, a haloalkyl and aryl and wherein the composition contains the siloxane compound in an amount so that upon application of the composition to the soil to provide treated soil, water penetrates through the treated soil and water is retained in soil beneath the treated soil.

2. A process according to claim 1 wherein the composition contains the siloxane compound in an amount of from 0.05% to 0.4% by weight.

3. A process according to claim 1 or 2 wherein the composition is applied to the soil by spraying.

4. A process according to claim 1 or 2 wherein the soil contains sand.

5. A process according to claim 1 or 2 wherein the carrier is water.

6. A process according to claim 1 or 2 wherein the carrier is dichloromethane.

7. A process according to claim 1 or 2 wherein R is a $C_1$-$C_{18}$ alkyl.

8. A process according to claim 1 or 2 wherein R is methyl.

9. A process according to claim 1 or 2 wherein R is fluoromethyl.

10. A process according to claim 1 or 2 wherein n is a number of from 5 to 45.

11. A process according to claim 1 or 2 wherein the carrier is selected from the group consisting of water and dichloromethane, wherein R is selected from the group consisting of methyl and fluoromethyl and wherein n is a number from 5 to 45.

* * * * *